June 17, 1969      T. H. MAIMAN      3,451,010

LASER SYSTEMS EMPLOYING A SOLID LASER MATERIAL

Original Filed April 21, 1964      Sheet 1 of 5

SUBSTITUTE FOR MISSING XR

INVENTOR.
THEODORE H. MAIMAN,
BY John M. Koch
ATTORNEY.

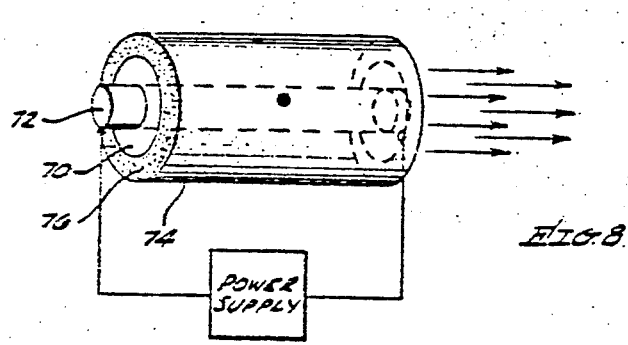
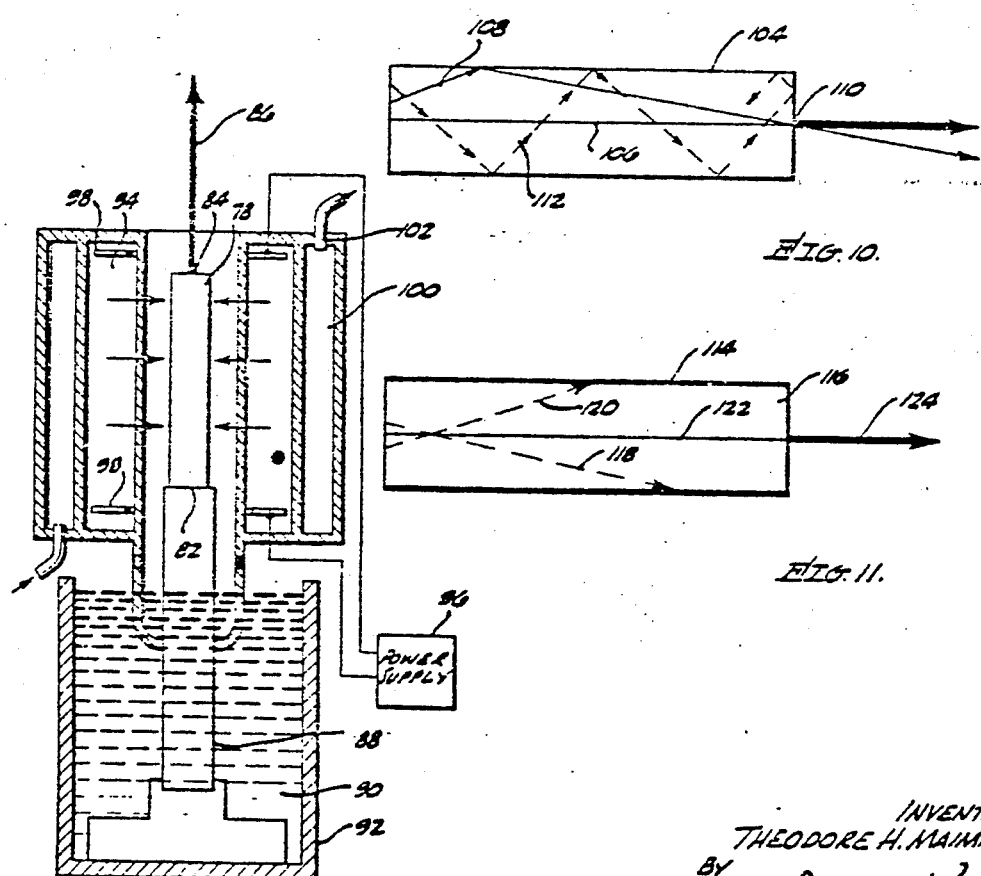

INVENTOR
THEODORE H. MAIMAN,
BY John M. Koch
ATTORNEY

INVENTOR.
THEODORE H. MAIMAN,
BY John M. Koch
ATTORNEY

United States Patent Office 3,451,010
Patented June 17, 1969

3,451,010
LASER SYSTEMS EMPLOYING A SOLID LASER
MATERIAL
Theodore H. Maiman, Los Angeles, Calif., assignor to
Hughes Aircraft Company, Culver City, Calif., a corporation of Delaware
Continuation of application Ser. No. 361,363, Apr. 21,
1964, which is a continuation-in-part of application Ser.
No. 102,698, Apr. 13, 1961. This application Mar. 10,
1967, Ser. No. 622,370
Int. Cl. H01s 3/16
U.S. Cl. 331—94.5         3 Claims

ABSTRACT OF THE DISCLOSURE

This invention relates to a three-level ruby laser wherein a broadband light pump directly pumps the ruby to excite atoms from a predetermined low energy level to a predetermined broadband of upper energy levels from which radiationless decay of energy of the atoms to a discrete lower energy level takes place. A regenerative action is also incorporated in the laser for stimulating the atoms in the ruby to cause a coherent radiative transition of the atoms from the discrete energy level toward the low energy level.

---

This is a continuation application of my copending application Ser. No. 361,363, filed Apr. 21, 1964, which is in turn a continuation-in-part of Ser. No. 102,698, filed Apr. 13, 1961, the last two identified applications having now been abandoned.

Much effort has been expended in the fields of electronics and physics in attempts to generate or amplify coherent light. Such an achievement, it was known, would make available a vast new region of the electromagnetic spectrum for a multitude of purposes including communications and metrology (measurements) applications. Such coherent light would have the properties of being monochromatic and of having its component waves propagating in phase with each other. Thus, as at radio or microwave frequencies, a great deal of energy could be concentrated at or extremely near to a single frequency and be utilized in methods analogous to those at radio frequencies.

Ordinary techniques of generating or amplifying electromagnetic waves, including microwave maser techniques, cannot be extended usefully into the optical frequencies because such techniques require components, such as maser cavities, for supporting wave oscillations which must have physical dimensions of the order of a wavelength. Obviously, such components can neither be manufactured nor meaningfully utilized at optical frequencies where the wavelengths are of the order of atomic dimensions. When it is attempted to use cavities which have dimensions corresponding to a large number of wavelengths, many modes are supported, coherence is degraded, and impracticably large sources of pumping power are required.

A laser has been proposed by Schawlow and Townes, see United States Patent No. 2,929,922, issued Mar. 22, 1960, which suggests using as the negative temperature medium certain gaseous state materials such as alkali metal vapors. Such materials may be shown to have energy levels in their atomic systems corresponding to appropriate optical frequencies for absorbing optical pump energy to invert the population from the stable equilibrium state and thus provide the material with what is known as a negative temperature or excited, nonequilibrium state. Then by stimulation or spontaneous relaxation the atomic system falls back to its normal equilibrium state by one or more steps emitting energy of certain optical frequencies.

Such proposed gaseous state devices are of great interest as theoretical models and represent significant academic advances, however, they have not been shown to provide a net generation or amplification of light. In addition, the structure of gaseous state systems is complex and requires the maintenance of critical vapor pressures and temperatures. Impurities in the gas is another very serious problem. The interatomic spacing of the gas severely limits the efficiency of coupling between the stimulated emission and a coherent wave propagating through the medium. In addition, the frequency of operation of any given gas laser may be effectively tuned only by Stark or Zeeman effects which can provide a tuning range of only approximately $5 \times 10^{10}$ cycles per second. Further, the construction of a gas cell is extremely critical in that the end plates must be highly reflective and perefectly parallel so that the many reflections required because of the low density gaseous material will be accomplished.

It is therefore an object of the present invention to provide an operable, low noise, efficient laser.

It is another object to provide a laser which is mechanically stable and of noncritical construction.

It is another object to provide a laser which operates at room temperature or cryogenic temperatures for additional simplicity and even greater flexibility in design parameters.

It is another object to provide a laser which does not require critical vacuum or vapor pressure techniques and which operates in a medium of high dielectric constant.

It is another object to provide a laser capable of much higher power handling.

It is another object to provide a laser which is tunable over approximately a $5 \times 10^{11}$ cycles per second range.

It is another object to provide an optical radar system utilizing the advantages of a laser.

Briefly, these and other objects are achieved in accordance with the present invention in a system including a solid state negative temperature medium.

In one example a segment of solid state active laser material such as a cylindrical ruby ($Al_2O_3$ doped with 0.05% $Cr_2O_3$) rod with reflecting coating at each end was coaxially placed in a helical flash lamp. White light or, predominantly, the green and blue components thereof, was absorbed by the ruby; and red light, having a wavelength of about 6900 A., was emitted therefrom and coupled out of the system through a hole in the reflective coating at one end of the rod. The reflecting coatings provide a regeneration related to the coupling between the reflecting wave, traveling back and forth many times, and the emitting atoms. In other words, a resonating, standing wave is provided which derives energy from the negative temperature dielectric. Thus the rod may be considered as a resonator having different Q's for different modes of oscillation. The mode having the highest Q corresponds to waves traveling nearly parallel to the rod axis since it supplies the highest degree of regeneration. This effect causes the output to be an extremely parallel beam so that it propagates immense distances without spreading. Inherent in the regeneration process is the coherent amplification of an extremely narrow band of frequencies, thus providing a monochromatic output. Additional discussion of principles of operation, of further objects and advantages, including uses, and of other examples will be presented below in connection with a description of the accompanying drawings in which:

FIG. 8 is a schematic diagram of an embodiment of the invention in which the active laser material is a hollow cylinder surrounding a cylindrical gas-filled flash tube, the entire assembly being surrounded by a second hollow cylinder of coolant of a high index of refraction;

FIG. 9 is a cutaway view of an embodiment of the present invention in which the laser material is refrigerated;

FIG. 10 is a diagram of a segment of laser material;

FIG. 11 is a diagram of a coated segment of laser material;

The laser to be hereinbelow described utilizes the interaction of electromagnetic radiation with a material having an appropriate set of discrete energy levels. Consider, for example, a pair of such levels with energies $E_1$ and $E_2$ where $E_2$ is greater than $E_1$. An electromagnetic wave of frequency $$\nu_{21} = \frac{E_2 - E_1}{h}$$

where $h$ is Planck's constant, coupled to the system stimulates both absorption and emission. In other words, atoms in the lower level make transitions to the upper level, each absorbing energy $E = \nu_{21}$ and similarly upper level atoms are stimulated downwardly, each of these giving up energy to the wave by radiating a like quantum of energy. The net absorption of the radiating wave interacting with the system is proportional to $N_1 - N_2$ where $N_1$ and $N_2$ are respectively the number of atoms in these two levels. Since in thermal equilibrium $N_1$ is greater than $N_2$ the indicated difference is positive and a wave propagating the length of the material is attenuated.

In a substance with a third energy level $E_3$ higher than either of the other two levels, energy can be supplied to the system by a radiating wave of frequency $$\nu_{31} = \frac{E_3 - E_1}{h}$$

If other parameters, and, in particular, relaxation times, in the material are suitably related, an inverted population will be produced such that $N_2$ is greater than $N_1$; then the net interaction with a radiating wave of frequency $\nu_{21}$ is emission and the wave is amplified. Also, by providing a feedback mechanism oscillation can be produced.

Visible light covers the electromagnetic spectrum approximately $4 \times 10^{14}$ cycles per second, that is, red light to approximately $7.5 \times 10^{14}$ cycles per second which is violet light. In substance as described above with energy levels such that $\nu_{21}$ lies in this frequency range can therefore amplify or generate visible light.

Figure 1:
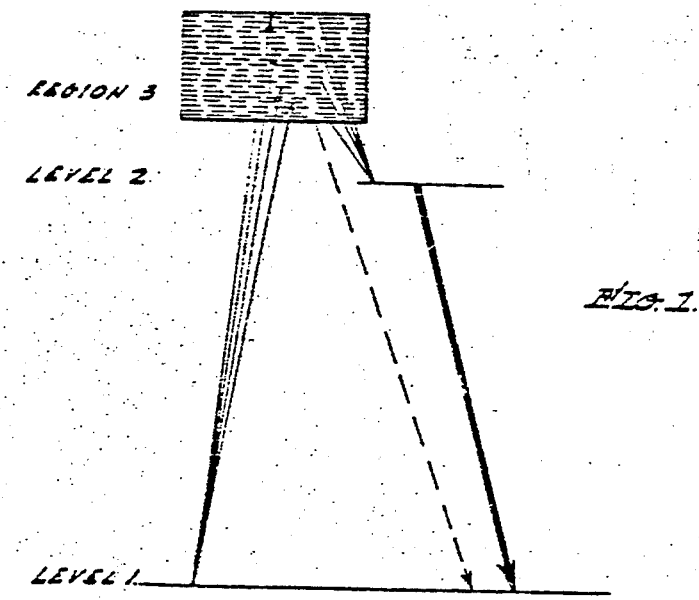
FIG. 1 is an energy level diagram for the atoms of a substance exhibiting laser properties.

Referring specifically to FIG. 1 an energy level diagram is illustrated for the atoms of a material such as $Al_2O_3$ which may exhibit laser action in accordance with the present invention. Level 1 may be considered the ground state corresponding to $E_1$ and region 3 in the relatively high energy state corresponding to $E_3$ which is actually a broadband of energy levels rather than a discrete energy level. The atoms, or ions, as the case may be, are excited or pumped from the level 1 to the region 3 by means of an optical pumping source having the energies or frequencies $\nu_{31}$ corresponding to the difference between the energy of level 1 and those of the levels throughout region 3. Because of the broadness of region 3, doping atoms, which for example may be the chromium atoms, may accept pumping energy over a correspondingly broad band. The atoms thus excited may then decay from the region 3 back to the ground state or, alternatively, they may decay to level 2 corresponding to $E_2$ and thence to level 1. The latter course is definitely the favored one and the atoms in decaying to level 2 do not emit energy. In other words, it is a radiationless thermal type of transition which funnels the energy distributed in the broad region 3 into the very narrow region 2. The energy level 2 is in fact a single energy level, or may in the presence of a magnetic field be a doublet, and the atoms of this state of excitation will emit the correspondingly discrete frequency $\nu_{21}$ corresponding to the difference between level 2 and level 1 that is $E_2 - E_1$ when they are appropriately stimulated or triggered to do so. Further, when an appropriate stimulation does occur, the atoms in the particular segment of laser material will fall together or emit their radiated energy coherently with each other and with the stimulating wave. Thus it may seen that the mechanism is a funneling of energy from a broadband incoherent source into a discrete frequency that is monochromatic coherent radiation.

Figure 2:
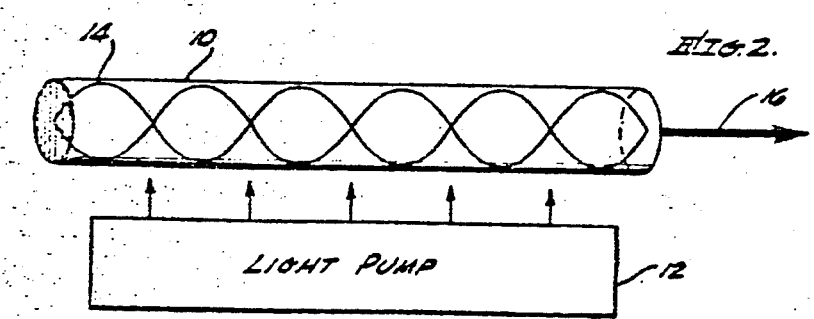
FIG. 2 is a schematic diagram illustrating optical pumping of negative temperature laser material.

Referring to FIG. 2, there is shown a schematic representation of the mechanism of optically pumping the atoms such as those of chromium in a ruby rod 10. A light pump 12 emits a high intensity "white" light or, in this example, it may be broadly green, toward the ruby rod 10. The broadband light thus radiated includes at least some light in the frequency range $\nu_{31}$. This light is absorbed by the ruby rod and causes the doping atoms to be excited in the energy state represented by region 3 of the diagram of FIG. 1. This excitation is equivalent to an inversion of the population of the chromium atoms as discussed above. The excited atoms then relax by thermal processes down to the level 2 and may remain there until stimulated to fall to the level 1 thereby emitting the desired monochromatic light of frequency $\nu_{21}$. This stimulation may be by an external source of radiation at frequency $\nu_{21}$, or it may be triggered spontaneously as by optical noise. When the energy at frequency $\nu_{21}$ is emitted from the atoms in the ruby rod 10 it causes a wave to propagate through the rod and if the wave is parallel to the axis it may reflect repeatedly from the ends of the rod. If the rod is of an appropriate length a standing wave 14 may be set up. In either event the repeated reflections through the material stimulate the emission of substantially all the atoms from level 2 to their ground state level 1. The emission of the energy at frequency $\nu_{21}$ combines in phase with the stimulating wave 14, thus adding coherently with it. This energy may then be coupled out of the rod as a beam 16 which is monochromatic at frequency $\nu_{21}$ and which is traveling or propagating in a direction parallel to the axis of the ruby rod 10.

Figure 3:
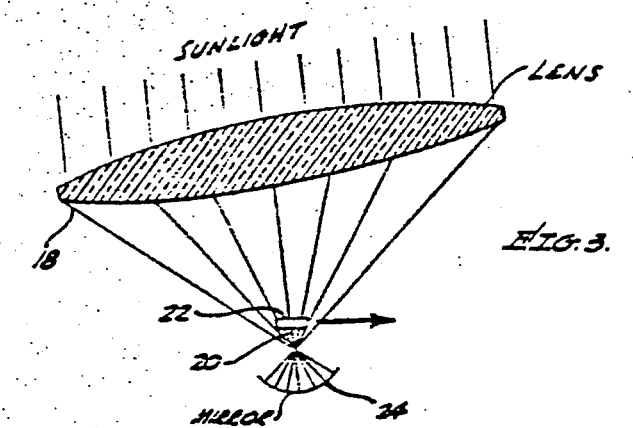
FIG. 3 is a schematic diagram of means for optically pumping the laser material with sunlight energy.

FIG. 3 illustrates an example of the invention in which the light pump 12 of FIG. 2 is the sun or some other source of parallel "white" light. The lens 18 focuses the light so that it is of relatively high intensity in a region 20 where an element of active laser material 22 is disposed. An auxiliary mirror 24 may further intensify the light in the region of the laser material. The mirror 24 may be a spherical reflector which merely sends the unabsorbed pumping light back through the focal point of the lens 18 and thence through the laser material 22 a second time.

Figure 4:
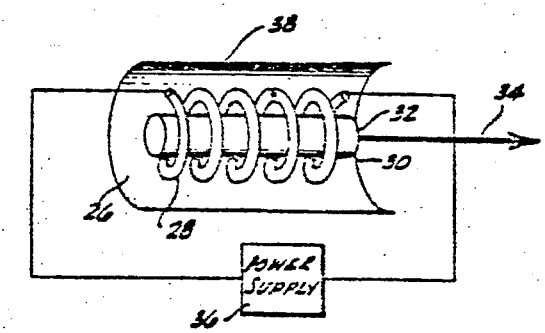
FIG. 4 is a schematic diagram of one embodiment of the present invention which utilizes a helical gas-filled flash tube for optical pumping of the laser material.

Referring to FIG. 4, an embodiment of the invention is shown in which an active laser rod 26 is disposed coaxially within a helical gas-filled flash tube 28. The ends of the rod 26 may be suitably plated as by a partial coating of silver in order to provide the repetitive reflections of the monochromatic emitted light. The system of stimulation is so efficient that a plating 26 which will provide approximately 10 percent reflection is adequate. One end of the rod 30 has a nonreflective opening 32 in the plating to provide unobstructed passage of the coherent monochromatic beam 34 as shown. A power supply 36 provides the flashing energy for the tube 28. An outer enclosing cylinder 38 is provided which has a very highly reflecting inner surface for reflecting the pumping energy repeatedly through the rod 26 for improved efficiency of the system as compared with operation when the light energy of the tube 28 is permitted to radiate indefinitely in all directions causing only a fraction of its energy to pass through the rod 26.

Figure 5:
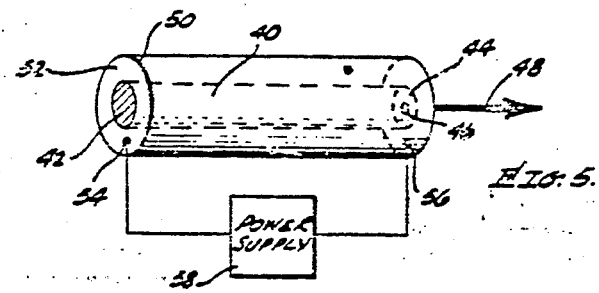
FIG. 5 is a diagram of an alternative embodiment utilizing a hollow gas-filled cylinder for optical pumping of the laser material.

Referring to FIG. 5, a rod of active laser material 40 is shown which again has reflectively coated ends 42, 44 with an opening 46 in the plating 44 to permit passage of the laser output beam 48. The light pump in this example is a hollow cylinder 50 which is coaxially disposed about the rod 42 with the radial space therebetween being filled with a flashing gas 52. Appropriate electrodes 54 and 56 at opposite ends of the cylinder 50 are energized by a power supply 58 to cause the gas 52 to emit high intensity "white" light when desired. Again, the inner surface of the cylinder 50 is highly reflective for added efficiency of the light pump mechanism.

Figure 6:
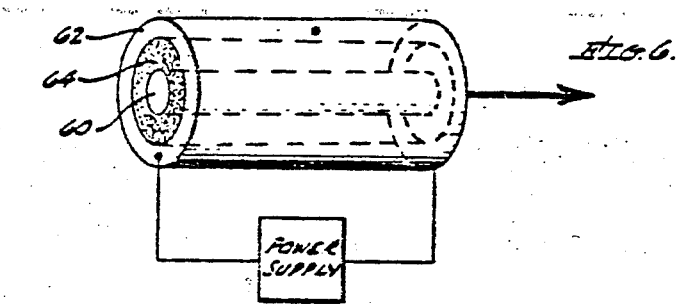
FIG. 6 is another embodiment of the present invention which utilizes a hollow cylindrical gas-filled optical pumping means which is radially separated from the active laser material by a fluorescent material.
Figure 7:
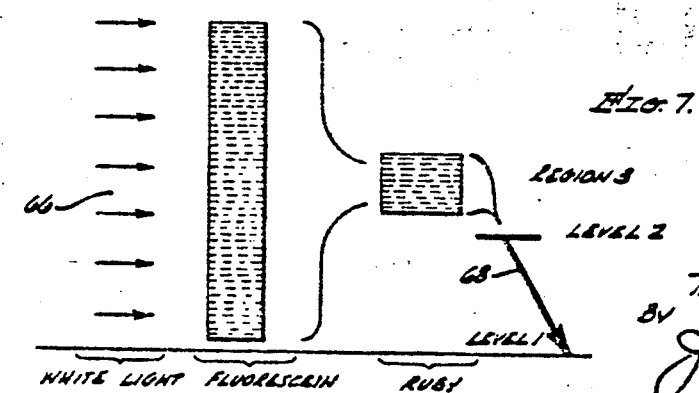
FIG. 7 is an energy level diagram illustrating the method of operation of the embodiment of FIG. 6.

FIG. 6 illustrates an embodiment of the invention in which a rod 60 of active laser material similar to rods 26 and 42 is disposed coaxially within a hollow flash tube 62. The radial space between the rod 60 and the flash tube 62 is filled with a fluorescent material 64, such as fluorescein. The fluorescent material efficiently absorbs the "white" light emitted by the flash tube 62 and re-emits predominantly green light which is more efficiently absorbed by the laser rod 60. Thus, as illustrated in FIG. 7, the broadband "white" light 66 is directed into the fluorescein which re-emits incoherent green light predominantly in the region 3 of the material discussed in connection with the description of FIG. 1. Thus the fluorescein effectively funnels the "white" light into green light which energy is further funneled and subsequently emitted as a single frequency or monochromatic light by the laser material, as indicated by the heavy vector 68 between level 2 and level 1 of FIG. 7. Again in FIG. 6 the inner surface of the cylinder surrounding the tube 62 may be highly polished for even greater efficiency of pumping.

Referring to FIG. 8 there is illustrated an example of the invention in which the active laser material is in the form of a hollow cylinder 70 within which is coaxially disposed a cylindrical flash tube 72. Thus when the flash tube is energized, substantially all of its pumping radiation is emitted in a radial direction and must therefore pass through the laser material. The laser material 70 is in turn coaxially surrounded by a cylinder 74 filled with a coolant 76. The coolant 76 may be chosen to have a high index of refraction for the advantages and purposes discussed below. Cylinder 74 may have a highly polished internal surface for reflecting energy of the flash tube 72 back through the laser material 70.

Referring to FIG. 9, an embodiment of the invention is shown in which the laser material is refrigerated to liquid nitrogen temperatures for the purpose of making its output beam even more purely monochromatic because the line width of the laser transition (frequency $\nu_{21}$) is much sharper in most solids at low temperature. A rod 78 of active laser material has plated ends 80 and 82 with a coupling hole 84 in the upper end for emitting the laser beam 86. The opposite end of the rod is mounted on a thermally conductive rod 88 which may be of copper or sapphire. The major portion of the rod 88 is immersed in liquid nitrogen 90 within a Dewar flask 92. A hollow cylindrical flash tube 94 is disposed coaxially about the laser rod 78 and is energized from a power supply 96 through a set of annular electrodes 98 disposed at opposite ends of the gas tube 94. A further hollow cylinder is disposed coaxially about the flash tube 94 and is filled with a coolant 102 to cool the flash tube 94.

FIG. 10 illustrates schematically a segment of laser material 104 for purposes of illustrating internal reflections of the stimulating wave when the segment is not coated but is merely surrounded by material of a low index of refraction, such as air. A ray of energy 106 is shown as propagating parallel with the axis of the rod and therefore never reflects against the side of the segment 104. A ray 108, however, has a radial component of direction and reflects, as shown, off the side boundary of the segment 104. Such reflections cause two deleterious effects. One is that the effective length of the resonating segment is greater than that for an axially traveling ray such as 106. Thus the ray 108 may represent a component of energy at a frequency slightly different from the desired or designed frequency of operation. Secondly, the ray 108, if it finds its way out of the coupling hole 110 of the segment 104, will cause a spreading of the beam thereby detracting from the otherwise extremely narrow beam of the laser and contributing to its noncoherence. A ray 112 propagating in a direction even further removed from that of the axis of the segment may obviously reverberate substantially endlessly through the segment causing by its interference with the desired energy a decrease in the coherence and narrowness of bandwidth of the laser output.

To minimize the deleterious effects of the rays 108 and 112 of FIG. 10 a coating 114 may be applied to an active laser segment 116 as illustrated in FIG. 11. The coating 114 may be chosen to be transparent to the pumping energy but highly absorptive of the frequency of light energy near to that of the desired laser output frequency so that rays 118 and 120 which are not parallel to the axis 122 of the segment are absorbed at the boundary by the coating 114 and hence do not degrade the desired characteristics of the output beam 124.

Figure 12:
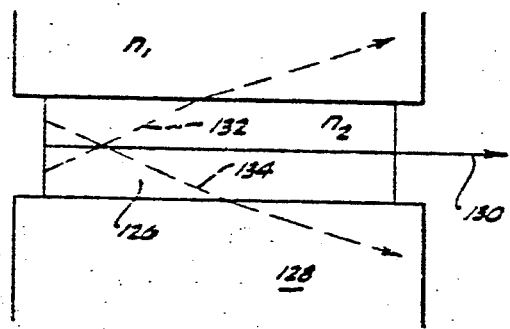
FIG. 12 is a diagram of a segment of laser material which is surrounded by a coolant having a high index of refraction.

FIG. 12 illustrates an alternative system for minimizing the deleterious effects due to the reverberation of nonparallel rays of the active laser segment 126. The segment is shown surrounded by a coolant material 128 having a high index of refraction in immediate contact with the surface of the segment 126. Again an axially directed ray 130 which is propagated back and forth along the length of the segment 126 can ultimately be coupled out of the segment resonator as a portion of the laser output beam. Nonparallel rays 132, 134 strike the side boundaries of the segment 126 and tend to be transmitted through the material of high index of refraction where they would otherwise be reflected by the boundary surface with a material such as air. The prime reason for this is that the critical angle between the rays 132, 134 incident upon the boundary is increased in proportion to the ratio of $n_1$ to $n_2$ where $n_1$ is the index of refraction of the material beyond the boundary. The critical angle is defined as that angle between the incident ray and a line normal to the boundary at which substantially all the energy transmits the boundary instead of being reflected by it. It is highly desirable that the critical angle be as large as possible so as to minimize the energy which is reflected by the boundary. In other words, it is desired to transmit the nonparallel rays 132, 134 out of the laser material where they may be dissipated without interfering with the laser regeneration mechanism and the output beam 130. It is apparent that if $n_1$ is as large as $n_2$ the critical angle would be 90° and, optionally speaking, there would be no boundary so that even energy grazing the surface would be transmitted therethrough. A practical example of a material having a suitably high index of refraction, as well as being an effective coolant, is diiodomethane which has an index of refraction of 1.75 which compares to the index of refraction of ruby which is approximately 1.76.

It is useful to provide a coolant for the active laser material in order to control its frequency of operation since the magnitude of the energy level 2 in a solid state substance is dependent upon temperature. This need not be a disadvantage since it affords a highly useful means for tuning the device over a relatively broad range, that is, approximately $5 \times 10^{11}$ cycles per second. However, it is important in many applications for the frequency to be controlled and constant by controlling or maintaining constant the temperature of the active substance. To this end, the active segment may be cooled and the heat energy of the pump removed by flowing appropriate coolants over their surfaces.

Figure 13:
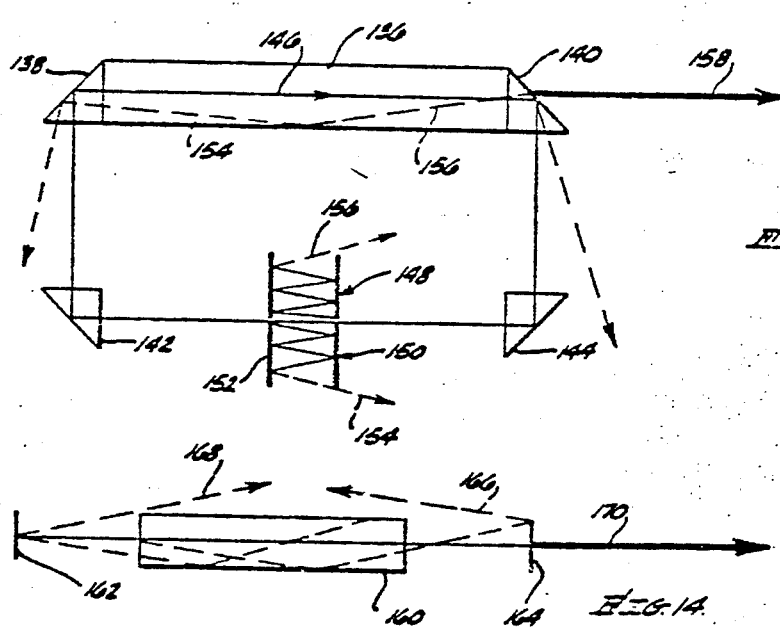
FIG. 13 is a schematic diagram of a portion of a laser system illustrating the use of an interferometer.

FIG. 13 illustrates a system in accordance with the present invention which utilizes an interferometer for providing even greater coherence and narrow bandwidth. In this embodiment a rod 136 of active laser material does not have coated ends but rather has prisms 138 and 140 coupled to each end of the rod 136. An additional pair of mirrors or prisms 142 and 144 are disposed so that a ray of light 146 which is axially directed through the rod 136 may propagate along the closed path determined by the reflecting surfaces of the 4 mirrors. Disposed between the mirrors 142 and 144 is an interferometer 148 which may be a Fabry-Perot interferometer. The interferometer comprises a pair of parallel plates 150 and 152, the distance between which may be adjusted to "tune" the regenerative circuit for the ray 146. Thus a ray of the proper wavelength will resonate between the parallel plates 150, 152 while waves of other frequencies will be dissipated and lost in the interferometer. The circuit defined by the reflective prisms and the interferometer is practically nonnegotiable for rays of light which are not propagating exactly parallel to the axis of the rod 136. Nonparallel rays 154 and 156 in the figure illustrates how their energy is lost from the system because their direction precludes their traversal of the circuit past the first reflective prism. Furthermore, even if a ray were almost parallel to the axis of the rod 136 it would not make a large number of traversals around the circuit before it would become lost from the edge of one of the prisms. Also the coupling through the interferometer may be made highly directive to further discriminate against waves which are not propagating in exactly the desired direction. As shown by rays 154 and 156 emanating from the interferometer, waves which are not propagated in the proper direction are lost out the sides of the interferometer and thereby removed from the system. The laser output beam 158 may be coupled out of the system in any appropriate manner such as for example by an appropriate discontinuity in the reflective face of the prism 140.

Figure 14:
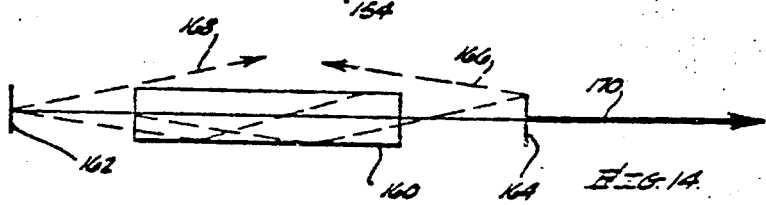
FIGS. 14 and 15 are schematic diagrams illustrating additional types of interferometers.

FIG. 14 illustrates another type of interferometer in which the active laser segment 160 does not have reflective ends. Instead, mutually parallel plates 162 and 164 are disposed perpendicularly to the axis of the segment 160 which is the desired direction of propagation. The plates may be disposed at some distance from the laser material; the greater the distance and the smaller their size the more the system discriminates against non-parallel light rays 166 and 168. Again the desired energy may be coupled out of the system through a small opening in the reflective plate 164 to provide a laser output beam 170.

Figure 15:
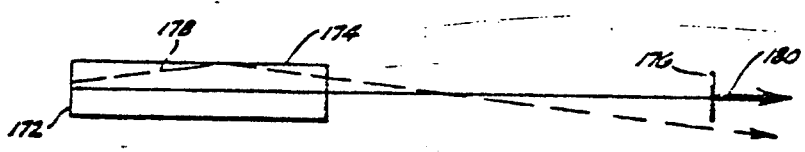

FIG. 15 illustrates the use of an interferometer similar in some respects to the device of FIG. 14. In this example one of the reflective plates 172 may be placed directly on the active laser segment 174 while the other reflective plate 176 may be axially disposed at some distance from the segment 174. As shown, the nonparallel ray 178 will not be re-reflected between the two reflective plates 172 and 176 thereby minimizing its deleterious effects on the monochromatic output beam 180.

Figure 16:
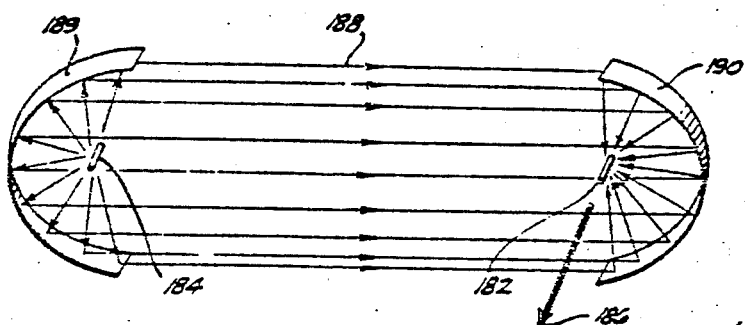
FIGS. 16 and 17 are diagrams of a laser system in which the optical pump utilizes an exploding wire.
Figure 17:
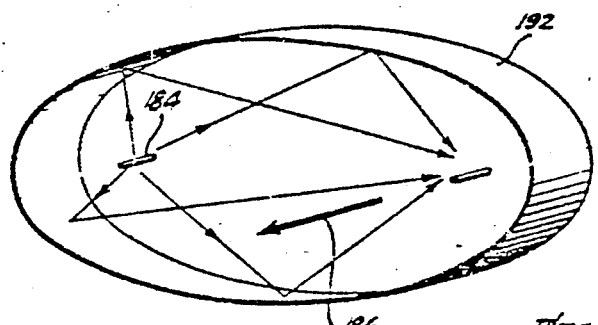

FIGS. 16 and 17 illustrate methods of optically pumping the active laser segment 182 by a source 184 of broadband light which is disposed some distance from the laser segment. In each case the output beam 186 of the laser is directed out of the rod-shaped laser segment in a direction parallel to the axis of the rod. In FIG. 16 two parabolic reflectors 189 and 190 are directed toward each other so that the light source 184 at the focal point of reflector 189 emits a substantially parallel beam of pumping light 188 which is collected by the parabolic reflector 190 and focused to pass through the laser segment 182. The parabolic surfaces 189 and 190 may be parabolic cylindrical surfaces as shown or they may be paraboloidal surfaces of revolution symmetrically disposed about the line joining their respective foci.

FIG. 17 illustrates an elliptical system for reflecting the energy from the light source 184 to the laser segment 182 wherein the source 184 is disposed at one focus of an ellipse while the laser segment 182 is disposed at the opposite focus; hence, the elliptical surface 192 reflects substantially all of the energy radiating from the source 184 and refocuses it through the laser segment 182. The elliptical surface 192 may be an elliptical cylindrical surface or it may be an ellipsoid.

The light source 184 in either of the above examples may make use of exploding wire phenomenon in which an extremly high current at low voltage is sent through a wire thereby exploding and vaporizing it. The light energy emitted by this phenomena may be extremely intense "white" light. Alternatively, the sources 184 may be other conventional light sources such as gas-filled flash tubes, or carbon arc lamps. An advantage of the systems depicted in FIGS. 16 and 17 is that the light source and the active laser material may be independently handled and cooled due to their spacing from each other.

Figure 18:
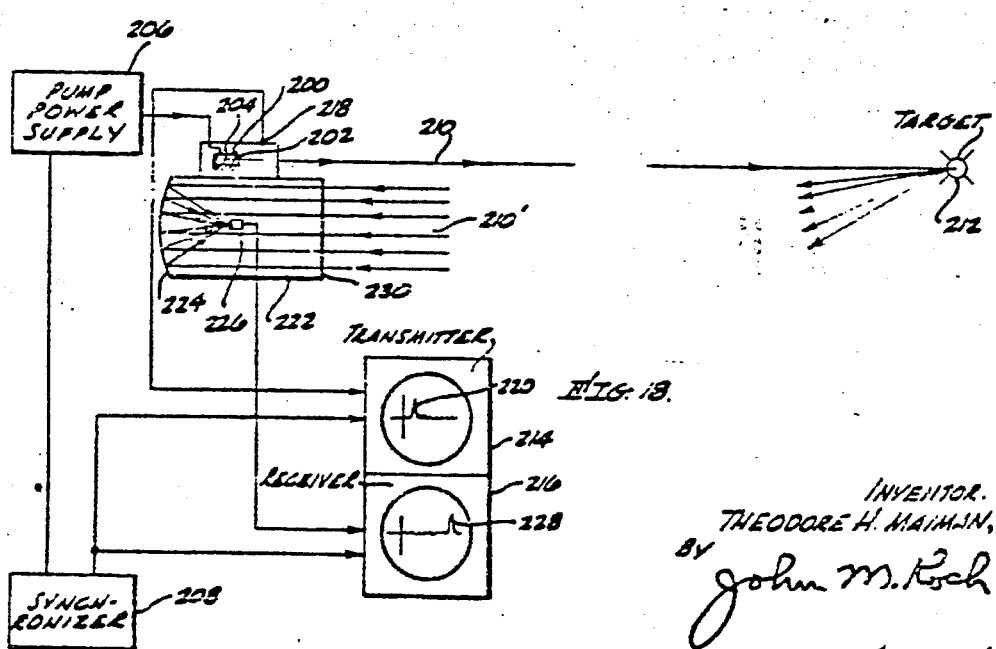
FIG. 18 is a schematic diagram of a practical colidar system utilizing a laser.

Referring to FIG. 18, there is illustrated a practical application of a laser in a colidar optical radar system. "Colidar" is an acronym for coherent light ranging. A laser unit 200 is the colidar transmitter and includes an active laser segment 202. Surrounding the segment 202 is a gas-filled flash tube 204 which is pulsed from a pump power supply 206. A synchronizer 208 triggers the pump power supply which in turn fires the flash tube 204 and the laser 200 transmits a beam 210 of monochromatic coherent light toward a target 212, the range to which is to be determined. The synchronizer trigger also triggers the horizontal sweeps of a pair of oscillographs 214 and 216. A sample of the laser output is detected by a photoelectric cell 218 which is coupled to the oscillograph 214 and presented on the face thereof as a "transmitter" pulse 220 to indicate the time at which the laser output pulse was transmitted. The laser beam 210 is reflected off a target 212 and a minute portion thereof is received as a parallel beam 210' by the colidar receiver 222. The received beam 210 impinges upon a parabolic reflector 224 and is focused into a photoelectric cell 226. The electrical output cell of the photoelectric cell 226 is coupled to the receiver oscillograph 216 where it is presented on the face thereof as a "receiver" pulse 228. The time difference between the pulses 220 and 228 on the two oscillographs is, of course, a direct indication of the range from the colidar system to the target 212. The two oscillographs 214 and 216 may alternatively be a dual trace, single oscillograph tube or, as in conventional radar "B-scope" presentation, be displayed with a single horizontal trace.

The advantages of such a ranging system which may obviously be extended to other forms of radar, such as plan position indicator types, include the fact the the transmitted beam is extremely narrow and may be sent over great distances with very little beam spreading.

Also the wavelength is so small that extremely high resolution is obtained. It may also be seen that it is substantially impossible to jam a laser radar system because the jamming equipment would have to be placed precisely in line with the transmitter and the target would have to be directed at the receiver and would have to be at precisely the proper optical frequency in order to interfere with the laser receiver. For further improvements in this regard optical filters 230 may be placed in the receiver 222 to discriminate not only against deliberate jamming but also against the minute amount of optical noise at the operating frequency.

There has thus been disclosed a laser system in which the active laser substance is solid state and which provides coherent monochromatic amplification and generation of electromagnetic wave energy in the optical or visible spectrum. The invention is effectively an efficient device which is mechanically stable and which may be operated at room temperature without complex vacuum or vapor pressure techniques. The invention as disclosed also is capable of tuning over a $5 \times 10^{11}$ cycles per second range and may handle high powers for practical optical radar and communications utilization. In addition, because it provides light which can be focused extremely precisely, the laser opens new possibilities in the investigation of basic properties of matter, as well as in medicine where objects or very minute portions thereof can be selectively sterilized or vaporized.

What is claimed is:

1. A laser system for operation in optical regions of the electromagnetic spectrum, comprising:
   an elongated ruby element having atoms exhibiting a first energy level corresponding to a ground atomic state, a substantially discrete second energy level above said ground state and third energy levels defining a relatively broadband absorption third region extending above said second level;
   pump means including a broadband light pump source optically coupled to said ruby element for pumping said element to excite said atoms from said first energy level to said third region from which radiationless energy transition of said atoms takes place to said discrete second energy level to establish a population inversion between said discrete second energy level and said ground state;
   fluorescent segment means interposed between said ruby element and said pump source for absorbing the broadband emission of said pump source and re-radiating it more predominantly as optical energy corresponding to the energy of said third region;
   reflective means having reflecting portions surrounding said ruby element, said broadband pump source and said fluorescent segment means for minimizing the escape of pumping energy from the system; and
   regeneration means selective of a predetermined wavelength and coupled to said ruby element for stimulating radiant energy transitions of said atoms from said discrete second energy level toward said first energy level to produce a coherent radiative transition of atoms from said discrete second energy level toward said first energy level.

2. A laser system for operation in optical regions of the electromagnetic spectrum, comprising:
   a hollow cylindrical elongated ruby element having atoms exhibiting a first energy level corresponding to a ground atomic state, a substantially discrete second energy level above said ground state and third energy levels defining a relatively broadband absorption third region extending above said second level;
   pump means including a cylindrical broadband light pump source disposed within and optically coupled to said ruby element for pumping said element directly with broadband light energy to excite said atoms from said first energy level to said third region from which radiationless energy transition of said atoms takes place to said discrete second energy level to establish a population inversion between said discrete second energy level and said ground state;
   hollow cylindrical reflective means having reflecting portions radially disposed of said ruby element for minimizing the escape of pumping energy from the system; and
   regeneration means selective of a predetermined wavelength and coupled to said ruby element for stimulating radiant energy transitions of said atoms from said discrete second energy level toward said first energy level to produce a coherent radiative transition of atoms from said discrete second energy level toward said first energy level.

3. A laser system for operation in optical regions of the electromagnetic spectrum, comprising:
   an elongated ruby element having atoms exhibiting a first energy level corresponding to a ground atomic state, a substantially discrete second energy level above said ground state and third energy levels defining a relatively broadband absorption third region extending above said second level;
   pump means including a broadband light pump source optically coupled to said ruby element for pumping said element directly with broadband light energy to excite said atoms from said first energy level to said third region from which radiationless energy transition of said atoms takes place to said discrete second energy level to establish a population inversion between said discrete second energy level and said ground state;
   coolant means disposed contiguously to said ruby element for controlling the temperature thereof, said coolant means having a relatively high index of refraction;
   reflective means having reflecting portions radially disposed of said coolant means for minimizing the escape of pumping energy from the system; and
   regeneration means selective of a predetermined wavelength and coupled to said ruby element for stimulating radiant energy transitions of said atoms from said discrete second energy level toward said first energy level to produce a coherent radiative transition of atoms from said discrete second energy level toward said first energy level.

References Cited

UNITED STATES PATENTS

| | | | |
|---|---|---|---|
| 2,929,922 | 3/1960 | Schawlow et al. | 331—94.5 |
| 3,087,374 | 4/1963 | Devlin et al. | 331—94.5 |
| 3,102,920 | 9/1963 | Sirons | 331—94.5 |

FOREIGN PATENTS

| | | |
|---|---|---|
| 1,260,230 | 3/1961 | France. |

OTHER REFERENCES

Geschwind et al.: "Optical Detection of Paramagnetic Resonance in an Excited State of $Cr^{3+}$ $InAl_2O_3$," Physical Review Letters, vol. 3, No. 12, Dec. 15, 1959, pp. 545–547.

Townes et al.: "Infrared and Optical Masers," Physical Review, vol. 112, No. 6, Dec. 15, 1958, pp. 1940–1949.

Varsanyi et al.: "Self-Absorption and Trapping of Sharp Line Resonance Radiation in Ruby," Physical Review Letters, vol. 3, No. 12, Dec. 15, 1959.

Collins et al.: "Coherence, Narrowing, Directionality, and Relaxation Oscillations in the Light Emission From Ruby," Physical Review Letters, vol. 5, No. 7, Oct. 1, 1960, pp. 303–305.

RONALD L. WIBERT, *Primary Examiner.*

U.S. Cl. X.R.

88—1